United States Patent [19]

Hoehn

[11] 4,105,862
[45] Aug. 8, 1978

[54] OUTLET BOX HAVING SCREW MOUNTING MEANS

[75] Inventor: Rudolph H. Hoehn, Queens, N.Y.

[73] Assignee: Slater Electric Inc., Glen Cove, N.Y.

[21] Appl. No.: 603,928

[22] Filed: Aug. 12, 1975

Related U.S. Application Data

[60] Division of Ser. No. 384,012, Jul. 30, 1973, Pat. No. 3,955,463, which is a continuation-in-part of Ser. No. 170,052, Aug. 9, 1971, abandoned.

[51] Int. Cl.² ............................................. H02G 3/08
[52] U.S. Cl. .......................................... 174/53; 85/36; 220/3.2
[58] Field of Search .................. 174/53; 220/3.2–3.94; 85/32 V, 36

[56] References Cited

U.S. PATENT DOCUMENTS

| | | | |
|---|---|---|---|
| 2,149,719 | 3/1939 | Arnest | 220/3.4 |
| 3,353,701 | 11/1967 | Palmer | 220/3.5 |
| 3,876,821 | 4/1975 | Pringle | 174/53 |

Primary Examiner—J. V. Truhe
Assistant Examiner—D. A. Tone
Attorney, Agent, or Firm—Morgan, Finnegan, Pine, Foley & Lee

[57] ABSTRACT

A screw mounting clip member is provided with a spring detent member cooperating with a stop member to slidably fixedly engage the clip in a slotted aperture adjacent an unthreaded screw-receiving borehole. Another spring detent member provided on the clip extends into the borehole when the clip is fixedly mounted in place. A threaded screw is fastened in the borehole by initially being manually thrust endwise into the borehole without turning, thereby deflecting and forcefully engaging the spring detent with the screw threads. The screw may thereafter be tightened by turning the screw against the spring detent and may be unfastened only by reverse turning of the screw, in the conventional manner.

13 Claims, 5 Drawing Figures

U.S. Patent     Aug. 8, 1978     4,105,862
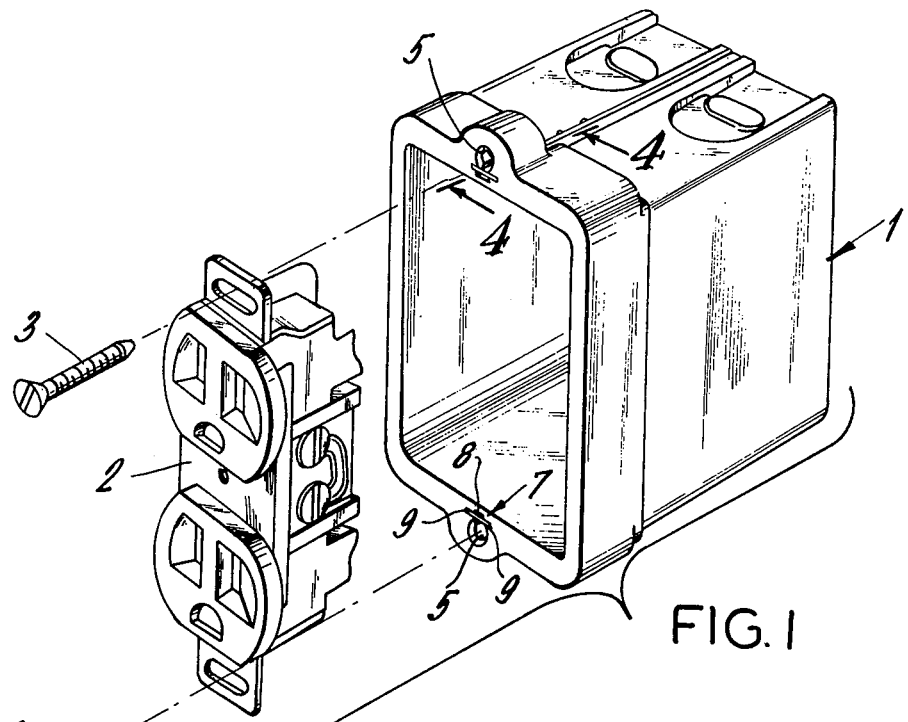
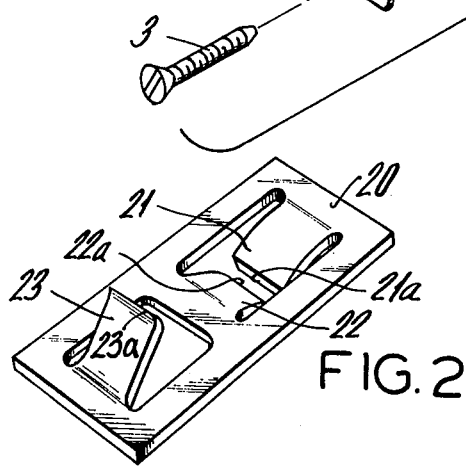
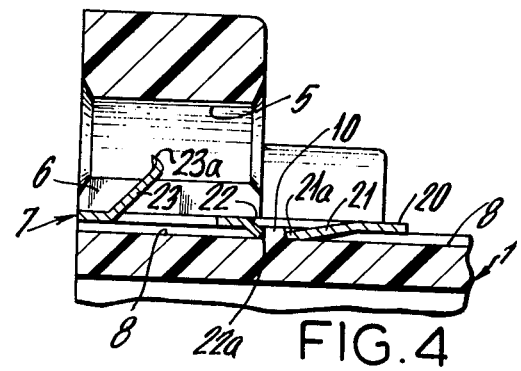
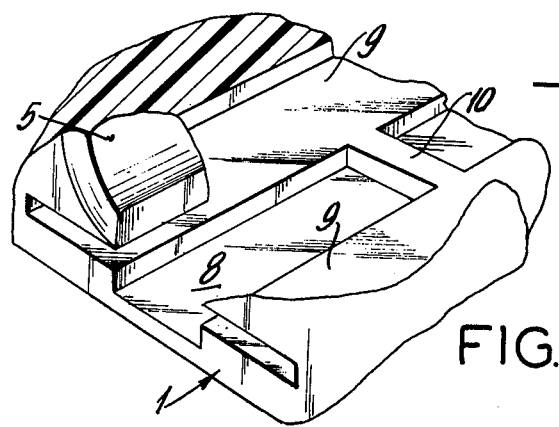
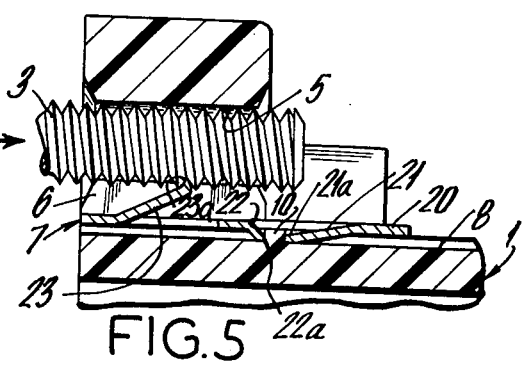

OUTLET BOX HAVING SCREW MOUNTING MEANS

CROSS-REFERENCE TO RELATED APPLICATION

This application is a division of my copending application, Ser. No. 384,012, filed Jul. 30, 1975, now U.S. Pat. No. 3,955,463 which is a continuation-in-part of my application, Ser. No. 170,052 which was filed Aug. 9, 1971, now abandoned.

BACKGROUND AND OBJECTS OF THE INVENTION

The present invention relates generally to screw mounting means and relates more particularly to certain new and useful improvements in the quick mounting of screws, of utility especially in the fastening of threaded screws to moldable plastic materials.

It is often desirable to be able to form various relatively light load-bearing constructional members from a moldable plastic material, such as, for example, electrical outlet boxes. However, disadvantages are encountered when it is necessary to mount threaded screws in such members, as it is difficult to mold internal plastic threads and also because such threads tend to be easily "stripped", rendering the entire mounting member completely useless.

It has also previously been recognized that it is desirable to provide a quick and easy means for mounting threaded screws, such as in the fastening of an electrical outlet receptacle to an electrical outlet box. Prior proposals, however, either have not performed satisfactorily or have not been usable with moldable plastic materials, or have been so cumbersome or complex as to be economically impractical to manufacture and therefore not commercially feasible.

It is therefore an object of this invention to provide a new and improved screw mounting means.

Another object of this invention is to provide a new and improved screw mounting means which permits threaded screws to be quickly and easily mounted.

Another object of this invention is to provide a new and improved screw mounting means which permits threaded screws to be easily and quickly fastened to moldable plastic materials.

Another object of this invention is to provide a new and improved screw mounting means which overcomes the aforementioned disadvantages of the prior proposals for quick fastening screw mounting means.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved screw mounting means which permits a threaded screw to be quickly and easily mounted in place and which also is particularly advantageous in permitting screw fastening devices to be used with moldable plastic materials.

In accordance with the invention, the screw-receiving borehole is unthreaded and is provided with a first axially extending slot in the wall thereof which communicates the borehole with a second slot extending adjacent and generally parallel to the borehole. A screw mounting clip member is slidably received and fixedly engaged within the second slot and includes a spring detent member which projects through the first slot into the borehole when the clip is mounted in place.

A threaded screw is advantageously quickly fastened within the borehole by initially being manually thrust endwise axially into the borehole without turning, whereupon the spring detent of the clip is deflected and forcefully engages the threads of the screw. Thereafter the screw is tightened down by turning it against the spring detent, and the screw may be removed only by reverse turning, in the conventional manner.

As preferably embodied, the aforementioned second slot includes a central portion of enlarged width having a shoulder extending thereacross intermediate the ends of the adjacent borehole. The clip member includes the aforementioned screw fastening spring detent member extending outwardly from one side thereof and also includes another clip-mounting spring detent member extending outwardly from the opposite side of the clip. The last mentioned spring detent cooperates with a stop member to fixedly engage the clip in the slot adjacent the screw-receiving borehole.

The clip member is assembled simply by sliding it into the slot extending adjacent the screw receiving borehole, whereupon the clip-mounting spring detent is deflected by the intermediate shoulder. As the free end of the spring detent moves past the shoulder, it "snaps" back into the slot, whereupon the stop member contacts the front face of the shoulder, thereby locking the clip in place with the screw-fastening spring detent member projecting into the screw-receiving borehole. Thereafter, a threaded screw may be mounted in the borehole as previously described.

It will be apparent from the foregoing general description that the objects of the invention specifically enumerated herein are accomplished by the invention as herein embodied.

Thus, the configuration of the screw-receiving borehole and the adjacent slot for mounting the screw mounting clip can be molded by any suitable molding technique, such as compression or injection molding, permitting the use of the invention with moldable plastic materials. The construction of the associated screw mounting clip member is extremely simple, as is its installation, again contributing to an economically practical product. The provision of a spring detent member extending into the screw-receiving borehole permits a threaded screw to be essentially instantaneously manually thrust endwise into the borehole over substantially its entire length, requiring only a single turn or two for final tightening, resulting in a quick and easy fastening of a threaded screw. At the same time, the spring detent prevents endwise outward movement of the screw and the screw can only be removed by reverse turning, in the conventional manner.

It will be understood that the foregoing general description and the following detailed description as well are exemplary and explanatory of the invention but are not restrictive thereof. Thus, while the screw mounting clip member of this invention is particularly adapted to and was designed for use in the quick fastening of electrical outlet receptacles to electrical outlet boxes by threaded screws, the principles underlying the operation of the invention are not limited to such usage. However, since the invention is particularly adaptable to such usage, reference will be made hereinafter thereto in order to provide an example of a practical and useful embodiment of the invention.

The accompanying drawings, referred to herein and constituting a part hereof, illustrate the preferred embodiment of the invention, and together with the description, serve to explain the principles of the invention.

BRIEF DESCRIPTION OF THE DRAWINGS

FIG. 1 is an exploded, perspective view of an electrical outlet box formed from a moldable plastic material and constructed in accordance with the invention, the view illustrating the assembly of a standard electrical outlet receptacle fastened to the outlet box by threaded screws;

FIG. 2 is an enlarged perspective view of a screw mounting clip member constructed in accordance with the invention;

FIG. 3 is an enlarged, fragmentary perspective view of the outlet box of FIG. 1, illustrating the slotted aperture adjacent the screw-receiving borehole for slidably receiving and fixedly engaging the screw mounting clip member of the invention in the electrical outlet box;

FIG. 4 is an enlarged, fragmentary sectional view taken along line 4—4 of FIG. 1, illustrating the screw mounting clip member of the invention fixedly mounted in place in the electrical outlet box, with its screw-fastening spring detent member projecting into a screw-receiving unthreaded borehole of the outlet box;

FIG. 5 is a view similar to that of FIG. 4, illustrating a threaded screw extending into the screw-receiving aperture of the outlet box and securely held therein by the deflected screw-fastening flange of the screw mounting clip.

DESCRIPTION OF THE PREFERRED EMBODIMENTS

Referring now more particularly to the embodiment of the invention shown in the accompanying drawings, there is illustrated in FIG. 1 an electrical outlet box, indicated generally by reference numeral 1, advantageously formed from a suitable moldable plastic material, adapted to receive and support a suitable standard electrical outlet receptacle 2 mounted thereto by means of threaded screws 3.

In accordance with the invention, moldable plastic outlet box 1 is provided with screw mounting means which permit the threaded screws to be quickly and easily fastened thereto.

To this end, outlet box 1 is suitably molded so as to include in opposed side walls along the perimeter of its open end, opposed unthreaded boreholes 5. Each borehole 5 contains an axially extending slot 6 communicating the borehole with an adjacent, generally rectangular, slot extending parallel thereto, indicated generally by reference numeral 7, slot 7 adapted to slidably fixedly receive a screw mounting clip 20 therein, as more fully described hereinafter.

Advantageously, and as here preferably embodied, slot 7 includes a central portion 8 of enlarged depth and side portions 9 of relatively narrow depth. A shoulder 10 extending across the central portion 8 of slot 7 serves to fixedly mount clips 20 in slot 7, as will be seen from the following description.

As best seen in FIG. 2, screw mounting clip 20 comprises a flat, relatively thin, rectangular member formed from a material, such as spring steel, which is substantially rigid but which yields or flexes under pressure. An elongated detent arm 21 is preferably formed integrally with clip 20 and extends angularly outwardly from one side thereof, terminating in a free end 21a which is in spaced, cooperating relationship with edge 22a of a short stop arm 22, also preferably formed integral with clip 20.

A separate, additional elongated, pawl-like detent arm 23 is also provided on clip 20, preferably integrally therewith, extending angularly outwardly from the side of clip 20 opposite that from which detent arm 21 and stop arm 22 extend. Detent arm 23 is adapted to forceably engage a threaded screw under spring pressure, as is more fully described hereinafter, and, to that end, its free end 23a is advantageously tapered and hooked so that it extends to the root of a threaded screw inserted into borehole 5 (see FIG. 5) to insure locking engagement between the screw and the detent arm 23.

It will be apparent from the foregoing description that the assembly and operation of the screw mounting means of the embodiment of the invention, as here illustrated in the environment of an electrical outlet receptacle mounted to an electrical outlet box, is as follows:

A screw mounting clip 20 is inserted into each of slots 7 formed in outlet box 1 with its clip-mounting spring detent arm 21 and cooperating stop arm 22 aligned with the enlarged depth portion 8 of slot 7 and its screw-fastening spring detent arm 23 aligned with slot 6 in borehole 5. In this position, the side edges of the clip are telescopically slidably received in the reduced depth side portions 9 of slot 7. Clip 20 is then slidably thrust into slot 7, whereupon detent arm 21 is deflected by shoulder 10. As the free end 21a of arm 21 slides past shoulder 10, arm 21 returns to slot 8 by spring action and at the same time stop arm 22 engages the front face of shoulder 10. Stop arm 22 prevents further inward movement of clip 20 and detent 21 prevents outward movement of clip 20 from slot 7. Clip 20 is thus locked in place in slot 7 with its outer edge flush with the outer end of outlet box 1 and its screw-fastening spring detent arm 23 extending into borehole 5 (see FIGS. 4 and 5).

Thereafter, receptacle 2 is advantageously quickly mounted to box 1 by manually thrusting each of the threaded screws 3 endwise into the respective boreholes 5 without turning, whereupon the respective spring detent arms 23 are deflected and forcefully engage the threads of the screws. Screws 3 are advantageously thrust into boreholes 5 as far as possible without turning, and are thereafter tightened down by being turned against the spring force of detents 23 with a screwdriver or the like until tightly secured within the boreholes. It has been found that the tightening operation requires only about one or two turns of the screwdriver. Thereafter, the screws may be removed only by reverse turning, in the conventional manner.

It will be seen that spring detent arm 23 of clip 20 extends angularly outward therefrom in a direction inwardly of borehole 5 when clip 20 is mounted into place. Thus, arm 23 bends under inward axial movement of a threaded screw into borehole 5, but wedges against the screw threads to prevent axial outward movement of the screw, except by reverse turning. It will be understood that arm 23 therefore must be formed from material which is sufficiently flexible to permit a slight bending thereof but which is sufficiently rigid so that it will not buckle under an axial outward force.

It will be understood that the invention is not limited to the use of any particular materials for its successful operation. Thus, while particularly advantageous where a threaded screw is to be mounted to a moldable plastic material, the screw mounting clip of this invention provides a quick and easy screw mounting means equally satisfactory with other materials. Also, while the screw mounting clip of the invention has been found to give satisfactory results when constructed of spring steel, it will be understood that other equivalent materials may also be used.

The invention in its broader aspects is not limited to the specific embodiments herein shown and described but departures may be made therefrom within the scope of the accompanying claims, without departing from the principles of the invention and without sacrificing its chief advantages.

What is claimed is:

1. An electrical junction box comprising:
   a unitary molded plastic enclosure having a bottom and upstanding opposite side and end walls defining an open face at their upper ends; and
   boss means on said box at opposite walls for mounting a bracket to said box, said boss means housing quick fastener means for reception of a threaded fastener,
   said boss means including a passageway and internal abutment means at said passageway and said quick fastener means comprising insert means in said passageway including means engaging said internal abutment means and means for engaging a threaded fastener,
   said passageway including a slot generally parallel to an enclosure wall and said insert means comprising a relatively thin metal clip receivable in said slot having oppositely bent tabs, one of said tabs adapted to engage a threaded fastener.

2. An electrical outlet box comprising:
   a plastic enclosure having a bottom wall and a generally continuous sidewall member upstanding therefrom, said sidewall member defining, with said bottom wall, a generally hollow chamber;
   at least one threaded-fastener mounting member formed on said sidewall portion, said mounting member including an unthreaded borehole adapted to receive a threaded fastener;
   a first slot formed in each said mounting member, adjacent said borehole;
   a second slot formed in each said mounting member adjacent said borehole and extending generally parallel thereto, said second slot being communicated with said borehole by said first slot,
   a clip member slidably receivable in each said second slot, each said clip member including first detent means adapted to project through said first slot into said borehole when said clip member is seated in said second slot and to permit inward axial movement of a threaded fastener into said borehole yet prevent outward axial movement of the threaded fastener therefrom; and
   means for slidably fixedly locking said clip member in said second slot.

3. An electrical outlet box according to claim 2, wherein said second slot includes:
   a central portion of enlarged depth; and
   a shoulder extending across said enlarged central portion intermediate the longitudinal ends of said second slot so as to form opposed sidewalls extending into said enlarged central portion thereof, and wherein said clip member includes:
      second detent means extending outwardly therefrom in a direction opposite to that of said first detent means; and
      stop means in spaced, cooperating relationship with said second detent means, each of said second detent means and said stop means adapted to extend into the central portion of said second slot,
   such that said clip member is slidably fixedly locked in said second slot by sliding said clip member thereinto until said second detent means and said stop means respectively abut said opposed sidewalls of said shoulder.

4. An electrical outlet box according to claim 3, wherein said second detent means comprise a yieldable arm member extending angularly outwardly from said clip member in a direction opposite to the direction of movement of the clip member as it is slidably inserted into said second slot, and the yieldable detent arm terminates in a free end at a spaced lateral distance from said stop means which is approximately equal to the width of said shoulder,
   such that when said clip member is slidably inserted into said second slot, said yieldable detent arm is deflected by said shoulder until said stop means contacts said shoulder, whereupon the free end of said detent arm falls past said shoulder into said central portion of said second slot to lock said clip member in said second slot.

5. An electrical outlet box according to claim 4, wherein said clip member is formed from spring steel and said yieldable detent arm and stop means are formed integrally with said clip member.

6. An electrical outlet box according to claim 2, wherein said first detent means comprise a yieldable pawl arm extending angularly into said borehole and inwardly thereof, whereby said pawl arm yields to inward axial movement of a threaded screw into said borehole but wedges against the screw threads to prevent outward axial movement of the screw.

7. An electrical outlet box according to claim 6, wherein said pawl arm is a spring member and is spring-biased against said threaded screw, whereby said screw may be tightened into and removed from said borehole by turning against the spring pawl arm.

8. An electrical outlet box according to claim 7, wherein said clip member is formed from spring steel and said spring pawl arm is formed integrally with said clip member.

9. An electrical outlet box according to claim 7, wherein the end of said spring pawl arm is provided with a tapered hook which is adapted to extend to the root of the threads on a screw inserted into said borehole.

10. An electrical outlet box according to claim 2, wherein said second slot includes an enlarged width portion forming a pair of laterally opposed seats, provided at the end thereof adjacent the top of said borehole and wherein said clip member includes:
    a pair of laterally opposed ears at one end thereof adapted to be received in said seats;
    yieldable detent means extending outwardly from the side of said clip member opposite that from which said first detent means extends, said yieldable detent means extending in a direction opposite to the direction of movement of said clip member so as to be deflected as it is slidably inserted into said second slot, and said yieldable detent means adapted to extend beyond the bottom end of said second slot when said ears are located in said seats, such that said clip member is slidably fixedly locked in said second slot by sliding said clip member thereinto until said ears are seated, whereupon said yieldable detent means bears against the backside of said boss member in which said borehole in formed.

11. An electrical outlet box according to claim 10, wherein said yieldable detent means comprises a pair of spring arm members.

12. An electrical outlet box according to claim 2, which includes two said boss members on generally oppositely disposed portions of said sidewall member.

13. An electrical outlet box according to claim 12 wherein said boss members are formed generally at the top edges of said sidewall portion.

* * * * *

Disclaimer 4,105,862.—*Rudolph H. Hoehn*, Queens, N.Y. OUTLET BOX HAVING SCREW MOUNTING MEANS. Patent dated Aug. 8, 1978. Disclaimer filed Apr. 7, 1980, by the assignee, *Slater Electric Inc.*

The term of this patent subsequent to May 11, 1993, has been disclaimed.

[*Official Gazette June 10, 1980.*]